US012632999B2

(12) United States Patent
Zhang et al.

(10) Patent No.: US 12,632,999 B2
(45) Date of Patent: May 19, 2026

(54) METHODS AND APPARATUS TO FACILITATE REGION OF INTEREST TRACKING FOR IN-MOTION FRAMES

(71) Applicant: QUALCOMM Incorporated, San Diego, CA (US)

(72) Inventors: Nan Zhang, Beijing (CN); Ping Li, Poway, CA (US); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 17/758,124

(22) PCT Filed: Dec. 31, 2019

(86) PCT No.: PCT/CN2019/130469
§ 371 (c)(1),
(2) Date: Jun. 28, 2022

(87) PCT Pub. No.: WO2021/134462
PCT Pub. Date: Jul. 8, 2021

(65) Prior Publication Data
US 2023/0041607 A1 Feb. 9, 2023

(51) Int. Cl.
*G06T 11/00* (2026.01)
*G06T 7/13* (2017.01)
(Continued)

(52) U.S. Cl.
CPC ................ *G06T 11/00* (2013.01); *G06T 7/13* (2017.01); *G06T 7/74* (2017.01); *G06V 10/25* (2022.01); *G06T 2207/10016* (2013.01)

(58) Field of Classification Search
None
See application file for complete search history.

(56) References Cited

U.S. PATENT DOCUMENTS 5,757,364 A * 5/1998 Ozawa ................... G09G 5/399
715/781
10,831,513 B2* 11/2020 Chiarella ................ G06F 9/451
(Continued)

FOREIGN PATENT DOCUMENTS

CN 101968887 A 2/2011
CN 103425452 A 12/2013
(Continued)

OTHER PUBLICATIONS

International Search Report and Written Opinion—PCT/CN2019/130469—ISA/EPO—Sep. 27, 2020.
(Continued)

*Primary Examiner* — Andrew G Yang
(74) *Attorney, Agent, or Firm* — Procopio, Cory, Hargreaves & Savitch LLP

(57) ABSTRACT

The present disclosure relates to methods and apparatus for display processing. For example, disclosed techniques facilitate region of interest tracking for in-motion frames. Aspects of the present disclosure can identify a layer of interest of a plurality of layers associated with a frame. Aspects of the present disclosure can also determine coordinates for a region of interest based on characteristics associated with the identified layer of interest. Further, aspects of the present disclosure can perform display processing on the region of interest of the frame based on the coordinates for the region of interest.

20 Claims, 7 Drawing Sheets

300

310

350

(51) Int. Cl.
  *G06T 7/73* (2017.01)
  *G06V 10/25* (2022.01)

(56) References Cited

U.S. PATENT DOCUMENTS

| | | | | |
|---|---|---|---|---|
| 2004/0056900 | A1* | 3/2004 | Blume | G06F 3/0481 |
| | | | | 715/807 |
| 2004/0201608 | A1* | 10/2004 | Ma | H04N 21/4263 |
| | | | | 715/719 |
| 2010/0220104 | A1* | 9/2010 | Tanaka | G09B 29/003 |
| | | | | 345/522 |
| 2011/0148918 | A1* | 6/2011 | Ishizawa | G06T 15/503 |
| | | | | 345/629 |
| 2013/0266292 | A1 | 10/2013 | Sandrew et al. | |
| 2013/0328922 | A1* | 12/2013 | Belanger | G06T 11/60 |
| | | | | 345/629 |
| 2014/0029868 | A1* | 1/2014 | Lorenz | G06T 11/00 |
| | | | | 382/302 |
| 2015/0062169 | A1* | 3/2015 | Bono | G09G 5/14 |
| | | | | 345/634 |
| 2015/0089384 | A1* | 3/2015 | Lewis | G06F 16/48 |
| | | | | 715/745 |
| 2015/0279058 | A1 | 10/2015 | Dong et al. | |
| 2015/0317945 | A1* | 11/2015 | Andress | G06T 11/00 |
| | | | | 345/592 |
| 2016/0028667 | A1* | 1/2016 | Faaborg | G06T 11/60 |
| | | | | 709/206 |
| 2016/0098972 | A1* | 4/2016 | Feit | G06T 11/001 |
| | | | | 345/593 |
| 2016/0335789 | A1 | 11/2016 | Zhang et al. | |
| 2017/0068405 | A1* | 3/2017 | Lue-Sang | G06F 8/61 |
| 2017/0154448 | A1* | 6/2017 | Wang | G06T 1/20 |
| 2018/0189073 | A1* | 7/2018 | Larabie-Belanger | G06F 8/38 |
| 2018/0275863 | A1* | 9/2018 | Li | G06F 3/04845 |
| 2018/0308287 | A1* | 10/2018 | Daniels | G06F 3/04845 |
| 2019/0057277 | A1* | 2/2019 | Wang | G06V 30/12 |
| 2019/0349558 | A1* | 11/2019 | Modrzyk | H04N 9/646 |
| 2019/0379876 | A1 | 12/2019 | Hur et al. | |
| 2020/0008142 | A1* | 1/2020 | Peng | G06F 1/3218 |
| 2020/0265585 | A1* | 8/2020 | Tasdizen | G06T 9/00 |
| 2021/0005004 | A1* | 1/2021 | Chandrasekaran | G06F 3/012 |
| 2022/0005255 | A1* | 1/2022 | Zhang | G06T 15/005 |

FOREIGN PATENT DOCUMENTS

| | | |
|---|---|---|
| CN | 103678631 A | 3/2014 |
| CN | 103999032 A | 8/2014 |
| CN | 108037872 A | 5/2018 |
| CN | 110210010 A | 9/2019 |
| WO | 02091302 A2 | 11/2002 |
| WO | 2015011109 A1 | 1/2015 |
| WO | 2017060423 A1 | 4/2017 |

OTHER PUBLICATIONS

Supplementary European Search Report—EP19958211—Search Authority—Munich—Sep. 19, 2023.
Guiju L., "System Design of the Region of Interest Compression in TV Tracker", Chinese Journal of Scientific Instrument, S1, vol. 35, No. 6, Jun. 15, 2014, pp. 91-94.

* cited by examiner

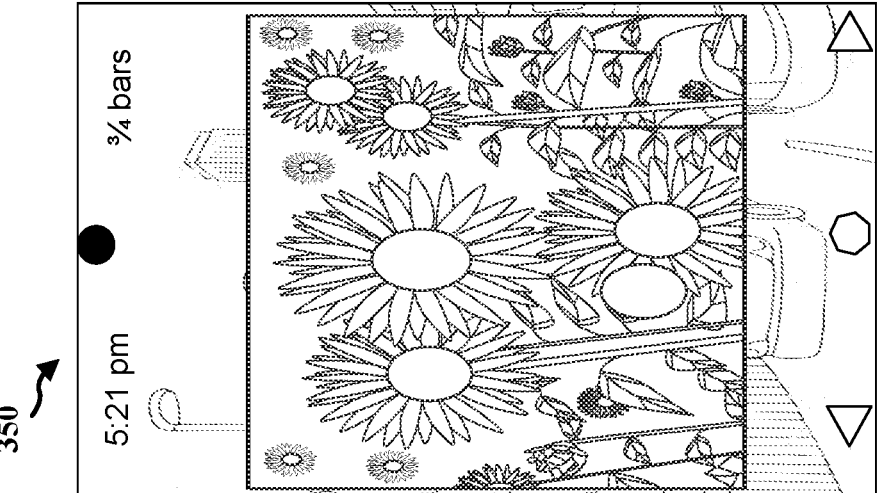
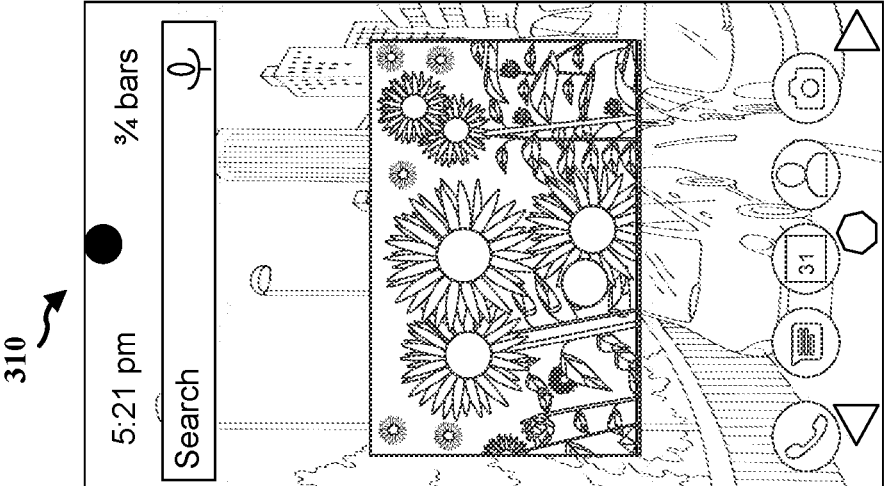
FIG. 3

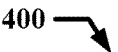

400

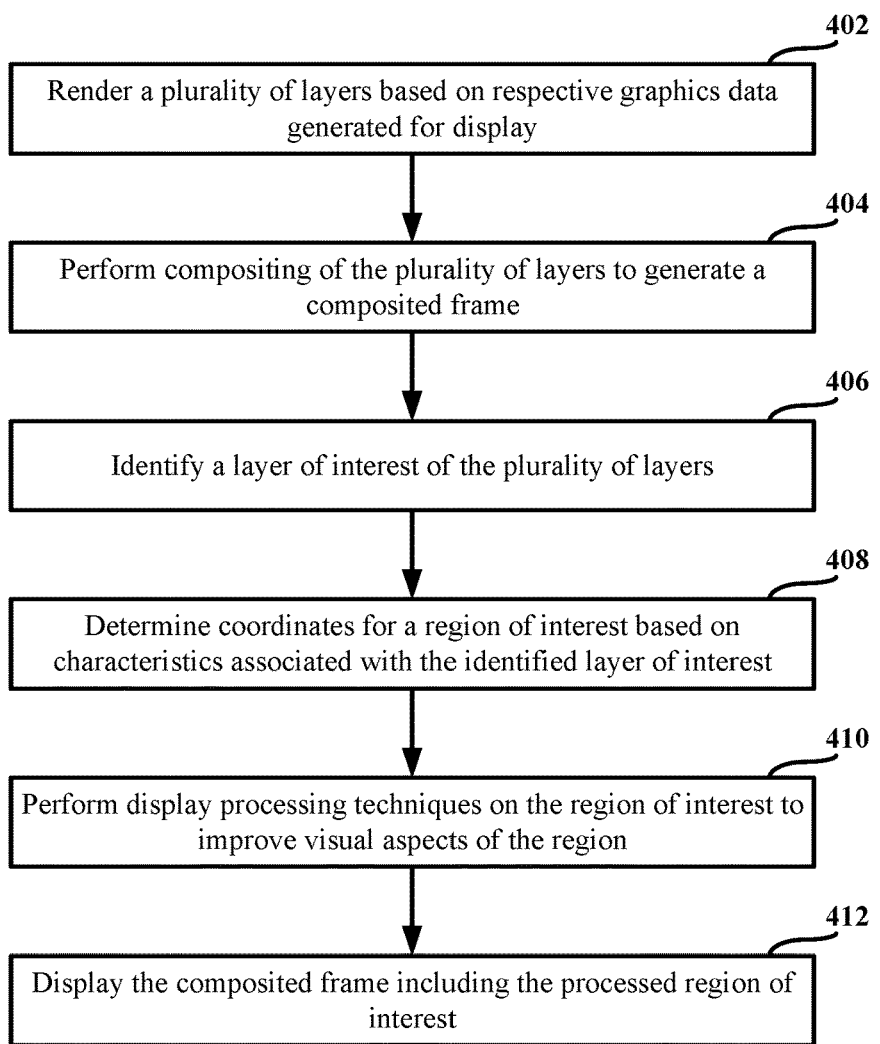

402

Render a plurality of layers based on respective graphics data generated for display

404

Perform compositing of the plurality of layers to generate a composited frame

406

Identify a layer of interest of the plurality of layers

408

Determine coordinates for a region of interest based on characteristics associated with the identified layer of interest

410

Perform display processing techniques on the region of interest to improve visual aspects of the region

412

Display the composited frame including the processed region of interest

FIG. 4

500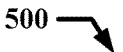

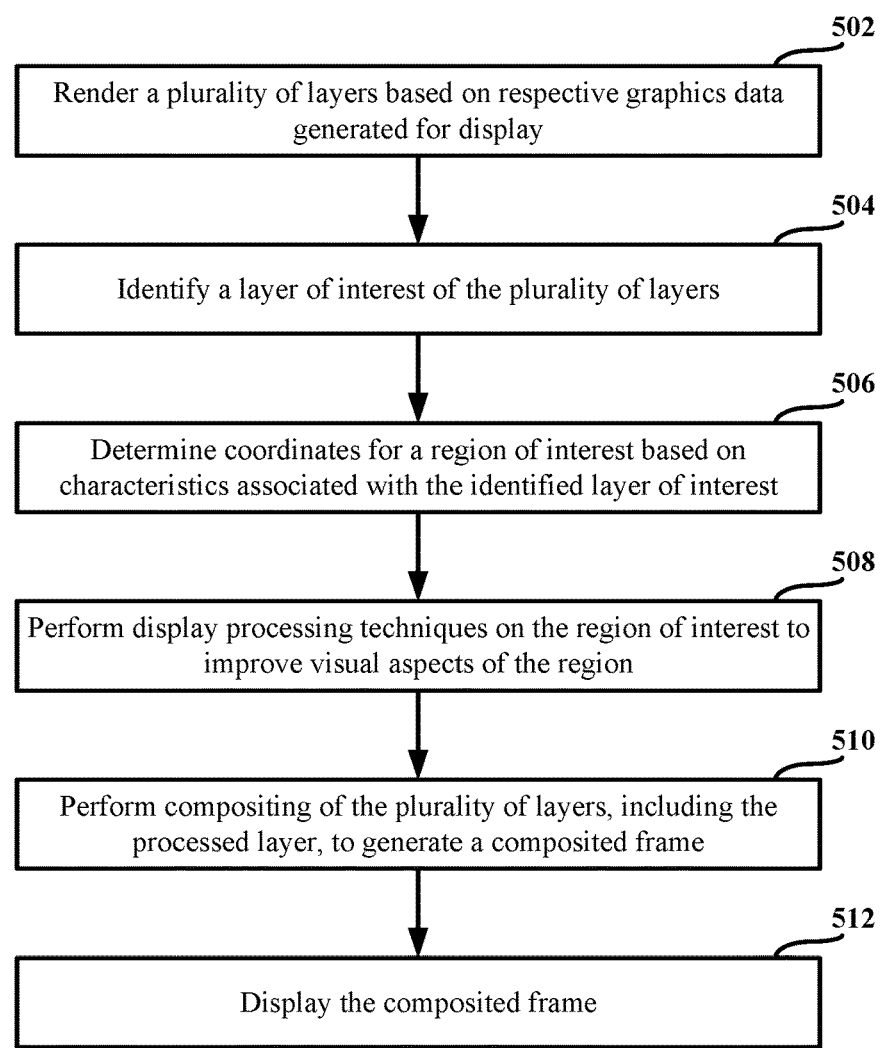

502

Render a plurality of layers based on respective graphics data generated for display

504

Identify a layer of interest of the plurality of layers

506

Determine coordinates for a region of interest based on characteristics associated with the identified layer of interest

508

Perform display processing techniques on the region of interest to improve visual aspects of the region

510

Perform compositing of the plurality of layers, including the processed layer, to generate a composited frame

512

Display the composited frame

FIG. 5

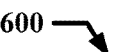

600

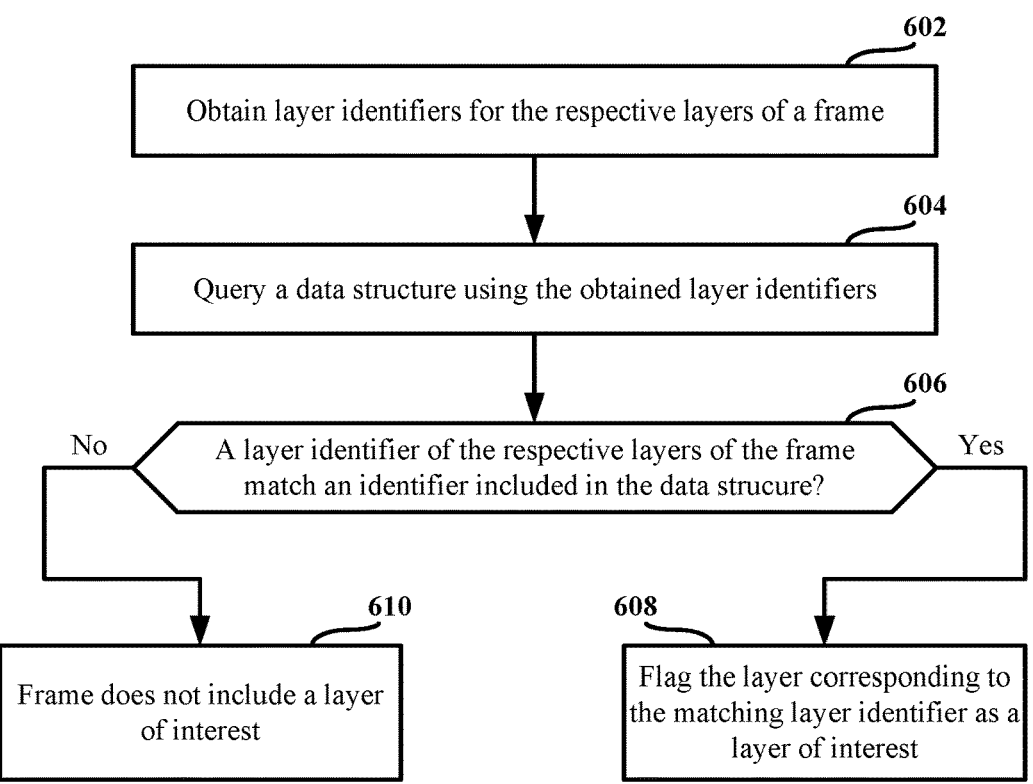

602

Obtain layer identifiers for the respective layers of a frame

604

Query a data structure using the obtained layer identifiers

606

No          A layer identifier of the respective layers of the frame match an identifier included in the data strucure?          Yes

610

Frame does not include a layer of interest

608

Flag the layer corresponding to the matching layer identifier as a layer of interest

METHODS AND APPARATUS TO FACILITATE REGION OF INTEREST TRACKING FOR IN-MOTION FRAMES

CROSS-REFERENCE TO RELATED APPLICATION

This application is National Stage Application filed under 35 U.S.C. § 371 of PCT International Application Serial No. PCT/CN2019/130469, entitled "METHODS AND APPA-RATUS TO FACILITATE REGION OF INTEREST TRACKING FOR IN-MOTION FRAMES" and filed Dec. 31, 2019, which is expressly incorporated by reference herein in its entirety.

TECHNICAL FIELD

The present disclosure relates generally to processing systems and, more particularly, to one or more techniques for display or graphics processing.

INTRODUCTION

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central pro-cessing unit (CPU) may control the operation of the GPU by issuing one or more graphics processing commands to the GPU. Modern day CPUs are typically capable of concur-rently executing multiple applications, each of which may need to utilize the GPU during execution.

A computing device may facilitate one or more graphics data producers to generate graphics data for display. For example, the computing device may include a processing unit configured to convert generated graphics data into a frame for display via a display client. In some examples, image processing techniques may be performed on the frame prior to presentment to improve aspects of the frame during presentment.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The appa-ratus may be a display processor, a display processing unit (DPU), a graphics processor, a GPU, an application proces-sor, a CPU, or a video processor. The apparatus can identify a layer of interest of a plurality of layers associated with a frame. The apparatus can also determine coordinates for a region of interest based on characteristics associated with the identified layer of interest. Additionally, the apparatus can perform display processing on the region of interest of the frame based on the coordinates for the region of interest.

The details of one or more examples of the disclosure are set forth in the accompanying drawings and the description below. Other features, objects, and advantages of the dis-closure will be apparent from the description and drawings, and from the claims.

BRIEF DESCRIPTION OF DRAWINGS

FIG. 3 illustrates an example first frame displayed at a first time and an example second frame displayed at a second time, in accordance with one or more techniques of this disclosure.

FIGS. 4 to 6 illustrate example flowcharts of example methods, in accordance with one or more techniques of this disclosure.

DETAILED DESCRIPTION

Figure 1:
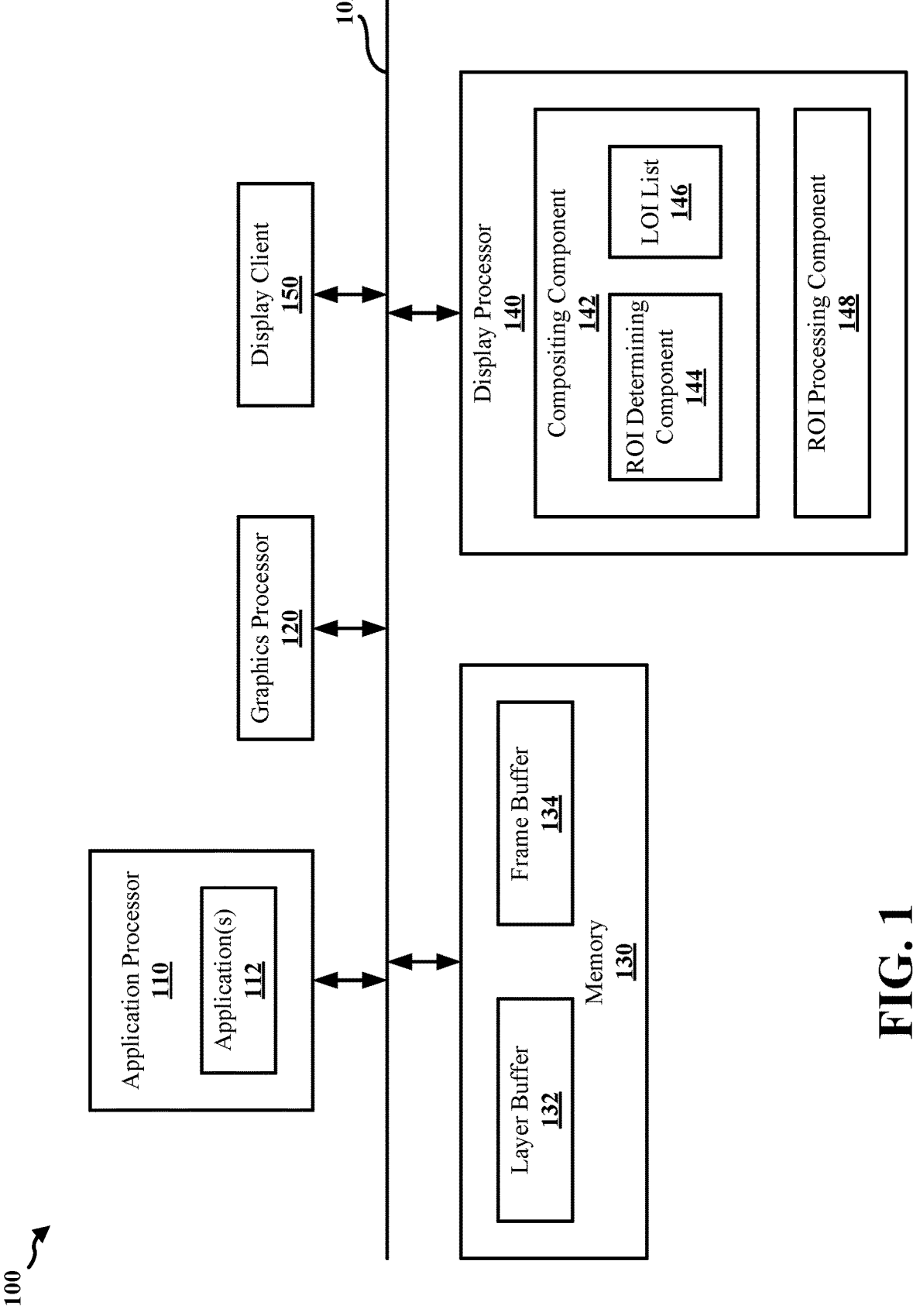
FIG. 1 is a block diagram that illustrates a device, in accordance with one or more techniques of this disclosure.

In general, examples disclosed herein provide techniques for improving region of interest tracking for in-motion frames. As used herein, the term "in-motion frames" refers to instances in which a sequence of frames is displayed (or presented) and graphical content of at least two of the frames of the sequence of frames is different. In some examples, one or more applications executing on a device may generate graphics data for display. For example, an application executing on the device may generate graphics data related to device status indicators, such as a current time, a current date, an audio volume, a signal strength indicator, etc. Another application executing on the device may generate graphics data related to a background interface, such as a wallpaper and/or edge(s) of the display. Another application executing on the device may generate graphics data related to an application user interface for displaying graphical content generated by the respective application. The graph-ics data generated by each of the respective applications may then be rendered (e.g., by a graphics processor) and stored as separate layers in a layer buffer. For example, the graphics data related to the device status indicators may be rendered and stored as a status bar layer at the layer buffer, the graphics data related to the background interface may be rendered and stored as a background layer at the layer buffer, and the graphics data related to the application user interface may be rendered and stored as an application interface layer at the layer buffer.

In some examples, to facilitate presentment of the gen-erated graphics data, disclosed techniques provide an example compositor configured to retrieve the layers stored in the layer buffer and composite (or blend) the layers to generate a composited frame that may be displayed via a display client. For example, the compositor may determine which layer(s) are to be displayed, which layer(s) may be occluded (e.g., by another layer), etc. and generate the composited frame based on the determinations. The com-posited frame (sometimes referred to as a "blended frame") may then be accessed by the display client for presentment.

In some examples, disclosed techniques may apply dis-play processing techniques to improve aspects of the dis-played frame. For example, disclosed techniques may include a local tone mapping (LTM) engine to facilitate improving the brightness of the displayed frame. In some examples, disclosed techniques may include a wavelet noise reduction (WNR) engine and/or a temporal noise reduction (TNR) engine to reduce noise in the displayed frame. In some examples, disclosed techniques may include an assertive display adjustment engine to facilitate adjusting gamma or color for each pixel in a region to adapt for variable lighting conditions. In some examples, disclosed techniques may employ additional or alternative display processing techniques, such as saturation adjustment techniques, hue adjustment techniques, and/or temperature adjustment techniques, to improve visual aspects of the displayed frame.

In some examples, a position of one or more of the layers may change from one frame to the next frame. For example, a layer may be removed, a layer may be displaced, a layer may be resized, etc. To alleviate concerns with the changing positions of one or more layers between frames, some examples may perform the one or more display processing techniques on the full frame.

However, it should be appreciated that applying the display processing techniques on a frame may consume resources (e.g., processing resources, memory resources, communication load, etc.) of the device. It should also be appreciated that applying display processing techniques to a full composited frame (and/or to all of the layers corresponding to the respective frame) may be inefficient. For example, one or more portions of the frame may be of relatively less importance than other portion(s) of the frame. For example, a frame may include aspects of a status bar layer (e.g., a current time, a current date, a current signal strength indicator, etc.), a background layer (e.g., a wallpaper, etc.), and an application interface layer. The application interface layer may correspond to graphics data generated by an image viewing application. In some such examples, it may be beneficial, when displaying the composited frame, to improve the visual aspects of the application interface layer by applying one or more display processing techniques to the application interface layer, while not performing one or more display processing techniques to the status bar layer and the background layer.

Example techniques disclosed herein facilitate identifying a layer of interest of a frame and performing one or more display processing techniques to the identified layer of interest and avoid performing the one or more display processing techniques on the full frame. For example, disclosed techniques enable a plurality of layers for a frame to be generated and stored in a layer buffer. In some such examples, each of the plurality of layers may be associated with an identifier and positional information. The identifier (e.g., a string of alphanumeric characters) may be used to identify the layer and/or the application that generated the graphics data associated with the respective layer. The positional information may be used to identify coordinates, such as x-y positions, of the frame to display the respective layer.

Example techniques disclosed herein enable comparing the layer identifiers for the layers associated with a frame to one or more priority identifiers to facilitate identifying a layer of interest. For example, a data structure, such as a list, a look-up table, etc., may include one or more identifiers associated with priority layers. As used herein, the term "priority layers" refers to the one or more layers for which improving visual aspects of the graphical content of the layer may be beneficial. For example, the data structure (sometimes referred to herein as a "layer of interest list" or "layer of interest list") may be populated with one or more identifiers that correspond to applications configured for generating an image, an animation, a sequence of images, a video, etc. Disclosed techniques may query the data structure using the layer identifiers for any matching identifiers. In some such examples, disclosed techniques may flag (or mark or identify) any layers of the frame corresponding to matching identifiers as layers of interest.

Although the above description provides an example in which the data structure includes identifiers associated with priority layers, it should be appreciated that in some examples, the data structure may include identifiers associated with layers that are relatively low priority. In some such examples, disclosed techniques may compare the layer identifiers associated with a frame to the relatively low priority identifiers stored at the data structure to identify any layers of the frame that are of relatively low priority. Disclosed techniques may then determine that any remaining layers (e.g., any layers that are not identified as relatively low priority layers) are layer(s) of interest.

After a layer of interest is identified, disclosed techniques may perform one or more display processing techniques to improve visual aspects of the identified layer (e.g., a layer of interest). In some examples, disclosed techniques may provide the layer of interest (and/or an identifier for the layer of interest) to one or more display processing engines to perform one or more display processing techniques, such as LTM, WNR, TNR, saturation adjustment, hue adjustment, temperature adjustment, and/or assertive display adjustment, etc., to improve visual aspects of the layer. In some such examples, after the one or more display processing techniques are applied to the layer of interest, examples disclosed herein may perform compositing of the layers of the frame, including the one or more display processed layers. In this manner, disclosed techniques may conserve resources by performing the display processing techniques on a layer of the frame (e.g., regions of interest) and avoid performing the display processing techniques on all of the layers of the frame and/or on layers of relatively less importance (e.g., a status bar layer, a background layer, etc.).

In some examples, after a layer of interest is identified, disclosed techniques may perform compositing of the layers to generate a composited frame. In some such examples, disclosed techniques may use positional information associated with the layer of interest to facilitate limiting the performing of the display processing techniques to the region of interest of the composited frame and not on the full frame. For example, disclosed techniques may provide the composited frame (and/or an identifier or location of the composited frame) and the positional information associated with the layers of interest to the one or more display processing engines. In some such examples, the positional information may correspond to the boundaries of the region of interest of the composited frame. The one or more display processing engines may then perform the respective display processing techniques on the graphical content of the composited frame bounded by the coordinates of the positional information. In this manner, disclosed techniques may conserve resources by performing the display processing techniques on a region of interest of the composited frame (e.g., the region(s) of the composited frame corresponding to the layer(s) of interest) and avoid performing the display processing techniques on the full frame.

Furthermore, by using the positional information associated with a layer of interest, disclosed examples provide techniques for efficiently identifying a region of interest in a frame. For example, when the position of a layer of interest changes between a first frame and a second frame that is displayed after the first frame, disclosed techniques may use the positional information associated with the layer of interest in the first frame to determine a first frame region of interest and may use the positional information associated with the layer of interest in the second frame to determine a second frame region of interest. Disclosed techniques may then perform the one or more display processing techniques on the first and second regions of interest to improve visual aspects of the respective frames.

As used herein, the term "frame" generally refers to graphical content for presentment via a display. In some examples, a frame may include a plurality of layers that correspond to graphics data generated by respective applications (also referred to as "content producers" or "producers"). As used herein, the terms "composited frame" or "blended frame" refers to a frame in which the plurality of layers associated with the frame are composited (or blended) together to form a frame. In some examples, the composited frame may include portions of the plurality of layers. For example, a portion of a first layer may be obfuscated by a portion of a second layer and, thus, the portion of the first layer may not be presented (or included) in the composited frame.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, examples disclosed herein provide techniques for performing regional processing of a frame. For example, examples disclosed herein provide techniques for performing one or more display processing techniques to improve visual aspects of a region of interest of a frame and avoiding performing one or more display processing techniques on the full frame. Example techniques may improve visual quality of regions of the frame associated with layers of interest and/or reduce the load of a processing unit (e.g., any processing unit configured to perform one or more techniques disclosed herein, such as an application processor, a CPU, a graphics processor, a GPU, a display processor, a DPU, and the like). For example, this disclosure describes techniques for graphics and/or display processing in any device that facilitates presentment of a frame. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

In some examples, as used herein, the term "display content" may refer to content generated by a processing unit configured to perform display processing. In some examples, as used herein, the term "display content" may refer to content generated by a display processing unit. Graphical content may be processed to become display content. For example, a graphics processing unit may output graphical content, such as a frame, to a buffer (which may be referred to as a "frame buffer"). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram of a device 100 configured to facilitate the presentment of a frame, in accordance with example techniques disclosed herein. For the example, the device 100 may be configured to render a plurality of layers associated with respective graphical data for a frame, identify a layer of interest of the plurality of layers, determine coordinates for a region of interest based on one or more parameters associated with the identified layer of interest, and perform one or more display processing techniques on the region of interest based on the determined coordinates. In the illustrated example of FIG. 1, the device 100 includes an application processor 110, a graphics processor 120, memory 130, a display processor 140, and a display client 150. In some examples, the application processor 110, the graphics processor 120, the memory 130, the display processor 140, and the display client 150 may be in communication via a bus 102. The example bus 102 may be implemented via any combination of bus structures and/or bus protocols. Although shown as separate components in the example of FIG. 1, it should be appreciated that in some examples, one or more of the application processor 110, the graphics processor 120, the memory 130, and/or the display processor 140 may be implemented via a combined component, such as an integrated circuit.

In the illustrated example of FIG. 1, the application processor 110 may include one or more processors that are configured to execute one or more applications 112. In some examples, aspects of the application processor 110 may be implemented by a CPU. In some examples, the application processor 110 may be configured to execute instructions that cause the application processor 110 to perform one or more of the example techniques disclosed herein.

The application processor 110 may be configured to execute various types of applications 112. Examples of the applications 112 include image viewing applications, video viewing applications, web browsers, email client, gaming application, or other applications that generate graphical content for display. For example, execution of the application 112 by the application processor 110 may cause the application processor 110 to transmit graphics data of the graphical content to the graphics processor 120 for processing (e.g., rendering) based on any commands that the application processor 110 provides to graphics processor 120. In some examples, the application processor 110 may store the graphics data and/or the commands at the memory 130 and instruct the graphics processor 120 to retrieve and/or access the graphics data and/or the commands from the memory 130 for processing.

In some examples, the application processor 110 may communicate with the graphics processor 120 via one or more application frameworks. The application frameworks may translate the commands into a format that is consumable by the graphics processor 120. In some examples, the application frameworks may include one or more libraries, one or more drivers, and/or one or more application processing interfaces (APIs). Example of such APIs include the DTRECTX API, the OPENGL API, the OPENGL ES API, and the OPENCL API. However, it should be appreciated that other examples may utilize additional or alternative APIs to facilitate communication between the application processor 110 and the graphics processor 120.

In the illustrated example of FIG. 1, the graphics processor 120 may include one or more processors that are configured to process (e.g., render) graphics data. In some examples, aspects of the graphics processor 120 may be implemented by a GPU. In some examples, the graphics processor 120 may be configured to execute instructions that cause the graphics processor 120 to perform one or more of the example techniques disclosed herein.

In some examples, the graphics processor 120 may be configured to perform graphics processing, such as in a graphics processing pipeline. For example, the graphics processor 120 may receive and/or access graphics data and/or commands from the application processor 110 and/or the memory 130. The graphics processor 120 may perform graphics processing (e.g., in a graphics processing pipeline) on the graphics data, in accordance with the respective commands, to generate a rendered layer.

In the illustrated example of FIG. 1, the memory 130 includes an example layer buffer 132 and an example frame buffer 134. In some examples, the memory 130 may also store instructions that, when executed, cause the application processor 110, the graphics processor 120, the display processor 140, and/or the display client 150 to perform one or more of the example techniques disclosed herein.

In some examples, the layer buffer 132 is configured to store rendered layers. For example, the layer buffer 132 may store rendered layers provided by the graphics processor 120. The example layer buffer 132 may also store layers on which one or more display processing techniques are applied.

In some examples, the rendered layers stored at the layer buffer 132 may be associated with characteristics, such as an identifier, positional information, overlay position, etc. However, it should be appreciated that other examples may associate additional or alternative characteristics with a rendered layer. The rendered layer may be assigned an identifier (e.g., a string of alphanumeric characters) that indicates an application that generated the graphics data rendered by the graphics processor 120. For example, a first application may generate graphics data associated with a status bar that, when rendered, is assigned a "status bar layer" identifier, an application viewing application may generate graphics data associated with a user interface that displays images that, when rendered, is assigned an "image viewing user interface layer," etc.

The rendered layer may also be associated with positional information, such as x-y coordinates, that indicate a position of the frame at which to display the respective layer. In some examples, the positional information may include first coordinates (x1, y1) and second coordinates (x2, y2) that define the boundary of the rendered layer. For example, the first coordinates may correspond to an upper-left position of the rendered layer and the second coordinates may correspond to a bottom-right position of the rendered layer. However, it should be appreciated that other examples may use additional or alternative techniques for defining the boundary of the rendered layer, such as first coordinates (x1, y1) that correspond to an upper-left position of the rendered layer and x-y offsets that may be used to calculate the coordinates (x2, y2) of a bottom-right position of the rendered layer.

The rendered layer may also be associated with an overlay position that defines a position in an overlay stack corresponding to the rendered layer. For example, the overlay stack may include the plurality of layers of a frame, with each rendered layer corresponding to a different layer level. In some examples, the overlay position may be used to determine the order in which to combine the rendered layers.

In some examples, the frame buffer 134 may be configured to store frames. For example, the frame buffer 134 may store one or more composited (or blended) frames that combine the plurality of layers stored at the layer buffer 132 for respective frames. In some examples, the frame buffer 134 may store a composited frame that includes a region of interest on which one or more display processing techniques are applied to improve visual aspects of the composited frame. In some such examples, the region of interest on which the one or more display processing techniques are applied may correspond to one or more identified layers of interest.

In the illustrated example of FIG. 1, the display processor 140 may include one or more processors that are configured to execute a compositing component 142 and a region of interest display processing component 148. In some examples, aspects of the display processor 140 may be implemented by a DPU. In some examples, the display processor 140 may be configured to execute instructions that cause the display processor 140 to perform one or more of the example techniques disclosed herein.

The compositing component 142 may be configured to composite (or blend) the plurality of layers of a frame into a frame (e.g., a composited frame). For example, the compositing component 142 may retrieve the plurality of rendered layers from the layer buffer 132 and composite the layers to form a single frame. Compositing of the rendered layers may be performed by stitching or otherwise combining the plurality of rendered layers to form a single composited frame. In some examples, the compositing of the rendered layers may include performing pixel blending and/or keying operation techniques.

In some examples, the compositing component 142 may perform the compositing based on the characteristics associated with the respective rendered layers. For example, the compositing component 142 may refer to the positional information of a rendered layer to determine the relative positioning of the rendered layer with respect to the frame. The compositing component 142 may also refer to the overlay position associated with each of the rendered layers to determine the order in which to overlay, underlay, or otherwise combine the plurality of rendered layers. It should be appreciated that in other examples, additional or alternative characteristics may be employed to perform the compositing of the rendered layers.

In the illustrated example of FIG. 1, the compositing component 142 includes an example region of interest (ROI) determining component 144 and an example layer of interest (LOI) list 146. Although shown as included in the compositing component 142 of FIG. 1, it should be appreciated that in other examples, the region of interest determining component 144 and/or the layer of interest list 146 may be components accessible to the compositing component 142. For example, the region of interest determining component 144 may be included in the display processor 140 and accessible to the compositing component 142 and/or the layer of interest list 146. Furthermore, the layer of interest list 146 may be stored at the memory 130 and accessed by the compositing component 142 and/or the region of interest determining component 144.

The example region of interest determining component 144 may be configured to facilitate the identifying of a layer of interest and the determining of the coordinates for a region of interest based on the identified layer of interest. For example, the region of interest determining component 144 may receive (or retrieve) the layer identifiers associated with the plurality of layers for a frame included in the layer buffer 132. The region of interest determining component 144 may use the layer identifiers to query the layer of interest list 146 to determine if any of the layer identifiers correspond to a layer of interest.

The example layer of interest list 146 may be a data structure, such as a list, a look-up table, etc., that is configured to store one or more identifiers associated with priority layers. For example, the layer of interest list 146 may be populated with one or more identifiers that correspond to applications configured for generating an image, an animation, a sequence of images, a video, etc. (e.g., an application that may be configured to generate graphics data for which applying display processing techniques may be beneficial). In some examples, the layer of interest list 146 may include a pre-generated list of identifiers. In some examples, the layer of interest list 146 may additionally or alternatively include a modified list of identifiers. In some examples, the modified list of identifiers may be based on a pre-generated list of identifiers. For example, an identifier in the pre-generated list of identifiers may be modified by replacing one or more characters (e.g., alphanumeric characters) of the identifier with a wildcard character, a space, by removing one or more characters of the identifier, and/or by including alternate spelling(s) of the identifier (and/or terms of the identifier). For example, a pre-generated list of identifiers may include an "image viewing user interface layer" and a modified list of identifiers may include the "image viewing user interface layer," a "video viewing user interface layer," an "image viewing UI layer," an "image surface layer," a "mage viewing user interface layer," a "*viewing user interface layer," an "imageViewingUserInterface layer," etc. In some examples, including the modified list of identifiers may improve the likelihood of layers of interest being identified due to, for example, misspelled terms, alternate spelling for terms, etc. that may be assigned to a layer.

The region of interest determining component 144 may use the layer identifiers of the plurality of layers to query the layer of interest list 146 and to determine if any of the layer identifiers of the plurality of layers match the identifiers included in the layer of interest list 146. In some examples, if the layer of interest list 146 indicates that a layer identifier matches an identifier included in the layer of interest list 146, the region of interest determining component 144 may determine that the corresponding layer as a layer of interest. In some examples, the region of interest determining component 144 may flag (or mark) the corresponding layer as the layer of interest. In some examples, the region of interest determining component 144 may flag one layer of the plurality of layers as a layer of interest. For example, if two or more layer identifiers match identifiers included in the layer of interest list 146, the region of interest determining component 144 may select one of the layers as the layer of interest based on, for example, a priority associated with the respective layers, an overlay position associated with the respective layers, etc. In some examples, the region of interest determining component 144 may flag each of the layers as a layer of interest.

As described above, in some examples, the layer of interest list 146 may be populated with identifiers associated with layers that are relatively low priority. In some such examples, the region of interest determining component 144 may query the layer of interest list 146 using the layer identifiers of the plurality of layers for any matching identifiers. The region of interest determining component 144 may then select layers corresponding to any unmatched identifiers as layers of interest.

It should be appreciated that in some examples, a frame may not include any layers of interest. For example, none of the layer identifiers of the plurality of layers may match an identifier included in the layer of interest list 146 and/or each of the layer identifiers of the plurality of layers may match respective identifiers associated with layers that are relatively low priority. In some such examples, the region of interest determining component 144 may determine that the frame does not include a layer of interest and that the performing of display processing techniques to improve visual aspects of the frame may be avoided.

After a layer of interest is determined, the region of interest determining component 144 may be configured to use characteristics associated with the layer of interest to determine the region of interest of a frame. For example, the region of interest determining component 144 may use the positional information (e.g., the x-y coordinates) associated with the layer of interest to determine the region of interest of the frame.

In some examples, the region of interest determining component 144 may modify the positional information associated with the layer of interest to determine the region of interest. For example, the region of interest determining component 144 may select a sub-region of the layer of interest and use coordinates associated with the sub-region to define the region of interest. In some examples, the region of interest determining component 144 may scale the positional information to determine the coordinates associated with a region of interest. For example, the region of interest determining component 144 may double the coordinates associated with the layer of interest, may half the coordinates associated with the layer of interest, etc. to determine the coordinates associated with the region of interest.

In some examples, the region of interest determining component 144 may be configured to determine the region of interest of a frame post-compositing. For example, the compositing component 142 may perform the compositing of the plurality of layers at the layer buffer 132. The region of interest determining component 144 may use the layer identifiers of the plurality of layers of the composited frame to determine the layer of interest and, based on the positional information associated with the layer of interest, determine the coordinates defining the region of interest of the composited frame. In some such examples, one or more display processing techniques may be applied to the region of the composited frame based on the coordinates defining the region of interest.

In some examples, the region of interest determining component 144 may be configured to determine the region of interest prior to the compositing of the layers to generate the composited frame. For example, the region of interest determining component 144 may use the layer identifiers of the plurality of layers stored at the layer buffer 132 to determine the layer of interest and, based on the positional information associated with the layer of interest, determine the coordinates defining the region of interest (e.g., the x-y coordinates associated with the layer of interest). In some examples, one or more display processing techniques may be applied to the layer of interest based on the coordinates defining the region of interest.

The region of interest display processing component 148 may be configured to perform one or more display processing techniques to improve visual aspects of a frame. For example, the region of interest display processing component 148 may include and/or access one or more engines configured to perform LTM, WNR, TNR, saturation adjustment, hue adjustment, temperature adjustment, and/or assertive display adjustment, etc.

In some examples, the region of interest display processing component 148 may perform the display processing techniques on a layer. For example, the region of interest display processing component 148 may receive (or retrieve) a layer of interest (or an identifier or memory location at the layer buffer 132 associated with the layer of interest) from the region of interest determining component 144. The region of interest display processing component 148 may also receive (or retrieve) coordinates associated with a layer of interest. For example, the region of interest display processing component 148 may also receive the positional information (e.g., x-y coordinates) associated with the layer of interest. In some such examples, the region of interest display processing component 148 may perform the one or more display processing techniques on the received layer of interest based on the received coordinates. The example region of interest display processing component 148 may then store the processed layer at the layer buffer 132 of the memory 130 and/or provide the processed layer to the region of interest determining component 144.

In some examples, the region of interest display processing component 148 may perform the display processing techniques on a region of interest of a composited frame. For example, the region of interest display processing component 148 may receive (or retrieve) a composited frame (or an identifier or memory location at the frame buffer 134 associated with the composited frame) from the region of interest determining component 144. The region of interest display processing component 148 may also receive (or retrieve) coordinates associated with a region of interest of the composited frame. For example, the region of interest may correspond to the layer of interest identified by the region of interest determining component 144. In some such examples, the region of interest display processing component 148 may perform the one or more display processing techniques on the composited frame at the region bounded by the received coordinates. The example region of interest display processing component 148 may then store the processed frame at the frame buffer 134 of the memory 130 and/or provide the processed frame to the region of interest determining component 144.

In the illustrated example of FIG. 1, the display client 150 is configured to display frames (e.g., composited frames) generated for presentment. In some examples, the display client 150 may retrieve (or receive) a frame from the frame buffer 134 and process the retrieved frame for presentment. It should be appreciated that in some examples, aspects of the display processor 140 and the display client 150 may be combined.

Figure 2:
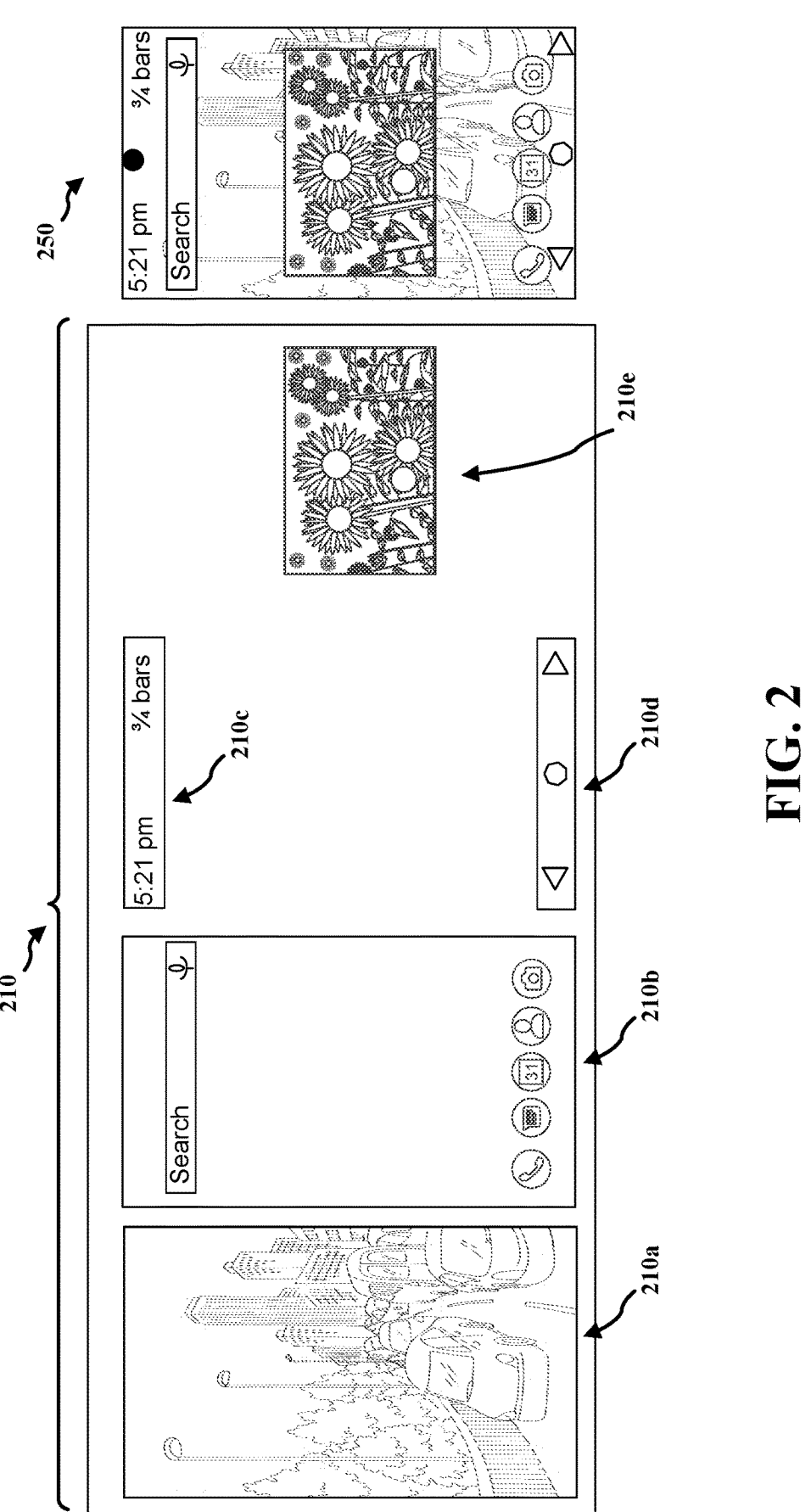
FIG. 2 illustrates an example composed frame including a plurality of layers, in accordance with one or more techniques of this disclosure.

FIG. 2 illustrates an example set of rendered layers 210 and an example composited frame 250, in accordance with one or more techniques disclosed herein. The set of rendered layers 210 may be generated by the graphics processor 120 of FIG. 1 and stored in the example layer buffer 132. As mentioned above, the compositing component 142 of FIG. 1 may be configured to blend or stitch the different rendered layers (e.g., the rendered layers 210) to generate the composited frame 250. For example, the compositing component 142 may retrieve the set of rendered layers 210 from the layer buffer 132 of the memory 130 and then perform blending and stitching of the pixel data of the rendered layers 210 to generate the composited frame 250.

In the illustrated example, the set of rendered layers 210 includes a first rendered layer 210a that represents a wallpaper, a second rendered layer 210b that represents launcher elements, a third rendered layer 210c that represents a status bar, a fourth rendered layer 210d that represents a navigation bar, and a fifth rendered layer 210e that represents an application user interface. The application user interface may be a user interface for an application configured to display an image (e.g., an image viewing application, a video viewing application, etc.). It should be appreciated that one or more of the rendered layers 210 may be rendered (e.g., via the graphics processor 120) based on graphics data generated by one or more respective applications 112 of FIG. 1.

In the illustrated example of FIG. 2, the rendered layers 210 are associated with respective characteristics, such as an identifier, positional information, overlay position, etc. For example, the first rendered layer 210a may be assigned a "wallpaper layer" identifier, may be associated with first coordinates (0,0) that define the upper-left position of the first rendered layer 210a, may be associated with second coordinates (828, 1792) that define the bottom-right position of the first rendered layer 210a, and may be assigned an overlay position of zero (e.g., a base layer). The fifth rendered layer 210e may be assigned a "image viewing user interface layer" identifier, may be associated with first coordinates (100, 300) that define the upper-left position of the fifth rendered layer 210e, may be associated with second coordinates (700, 1030) that define the bottom-right position of the fifth rendered layer 210e, and may be assigned an overlay position of five (e.g., a top-most layer). It should be appreciated that the other layers 210b, 210c, 210d of the rendered layers 210 may each be associated with respective characteristics.

In the illustrated example of FIG. 2, it may be beneficial to perform one or more display processing techniques on the fifth rendered layer 210e corresponding the image viewing user interface layer. For example, the region of interest determining component 144 of FIG. 1 may query the layer of interest list 146 using the identifiers associated with each of the rendered layers 210 to check if one of the layer identifiers matches an identifier included in the layer of interest list 146. In the illustrated example, the "image viewing user interface layer" identifier may match an identifier included in the layer of interest list 146. The region of interest determining component 144 may then use the positional information associated with the fifth rendered layer 210e to determine the region of interest.

As described above, in some examples, the region of interest determining component 144 may be configured to determine the region of interest prior to the compositing of the rendered layers. In some such examples, the region of interest determining component 144 may determine that the region corresponding to the fifth rendered layer 210e is the region of interest and use the positional information associated with the fifth rendered layer 210e (e.g., the first coordinates (100, 300) and the second coordinates (700, 1030)) as the coordinates defining the region of interest. The region of interest display processing component 148 may then perform one or more display processing techniques to improve visual aspects of the region (e.g., the layer of interest) based on the coordinates defining the region of interest. For example, the region of interest display processing component 148 may include and/or access one or more engines configured to perform LTM, WNR, TNR, saturation adjustment, hue adjustment, temperature adjustment, and/or assertive display adjustment, etc. The processed layer may be stored in the layer buffer 132 and the compositing component 142 may then perform the compositing of the rendered layers 210, including the processed layer, to generate the composited frame 250.

In some examples, the region of interest determining component 144 may be configured to determine the region of interest after the compositing of the rendered layers. In some such examples, the compositing component 142 may perform the compositing of the rendered layers 210 to generate a composited frame and store the composited frame in the frame buffer 134. The region of interest determining component 144 may also use the positional information associated with the fifth rendered layer 210e (e.g., the first coordinates (100, 300) and the second coordinates (700, 1030)) as the coordinates defining the region of interest. The region of interest display processing component 148 may then perform one or more display processing techniques to improve visual aspects of the region of the composited frame based on the coordinates defining the region of interest. The processed composited frame may then be stored in the frame buffer 134 until a display (e.g., the display client 150 of FIG. 1) retrieves the composited frame from the frame buffer 134 for presentment.

FIG. 3 illustrates a sequence of frames 300 including a first frame 310 and a second frame 350, in accordance with one or more techniques of this disclosure. In the illustrated example, the first frame 310 corresponds to the composited frame 250 of FIG. 5, including the rendered layers 210. The second frame 350 is displayed after the first frame 310 and is composited from a different set of rendered layers. For example, the second frame 350 includes a wallpaper layer, a status bar layer, a navigation layer, and an image viewing user interface layer. Furthermore, the positional information associated with the image viewing user interface layer has changed between the first frame 310 and the second frame 350. For example, the positional information associated with the image viewing user interface layer may include first coordinates (10, 50) defining the upper-left position of the image viewing user interface layer and second coordinates (800, 1400) defining the bottom-right position of the image viewing user interface layer.

As described above, in some examples, to avoid performing one or more display processing techniques on an incorrect region of the frame (e.g., after a layer changes positions), some examples may perform the one or more display processing techniques on the full frame. However, the techniques disclosed herein enable the identifying of a region of interest for each frame based on the positional information associated with a layer of interest. Accordingly, even when positional information for a layer of interest (e.g., the image viewing user interface layer) changes between the first frame 310 and the second frame 350, the disclosed techniques facilitate an efficient determination of the coordinates of the region of interest (e.g., the region corresponding to the image viewing user interface layer).

Thus, it should be appreciated that the example techniques disclosed herein facilitate performing one or more display processing techniques on a region of interest of a frame and avoid performing one or more display processing techniques on the full frame. By performing the one or more display processing techniques on a region of interest (and not on the full frame), disclosed techniques facilitate reducing resources consumed by the techniques for display processing disclosed herein.

FIG. 4 illustrates an example flowchart 400 of an example method in accordance with one or more techniques of this disclosure. The method may be performed by an apparatus, such as the device 100 of FIG. 1, a CPU, an application processor, a DPU, a display processor, a GPU, a graphics processor, a video processor, and/or a component of the device 100, such as the display processor 140, the compositing component 142, the region of interest determining component 144, and/or the region of interest display processing component 148. The example method of FIG. 4 may facilitate improving visual aspects of a region of interest of a frame after the compositing of the layers of the frame.

At 402, the apparatus may render a plurality of layers based on respective graphics data generated for display, as described in connection with the examples of FIGS. 1 to 3. For example, one or more applications 112 may be configured to generate graphics data and the graphics processor 120 may be configured to render the set of layers 210 based on the respective graphics data.

At 404, the apparatus may perform compositing of the plurality of layers to generate a composited frame, as described in connection with the examples of FIGS. 1 to 3. For example, the compositing component 142 may be configured to retrieve (or receive) the rendered layers 210 from the layer buffer 132 and perform compositing on the rendered layers 210 to generate a composited frame. For example, the compositing component 142 may blend pixel data of the rendered layers and the processed layers to generate the composited frame.

At 406, the apparatus may identify a layer of interest of the plurality of layers as described in connection with the examples of FIGS. 1 to 3. For example, the region of interest determining component 144 may be configured to identify the layer of interest based on characteristics associated with the plurality of layers and a data structure populated with identifiers associated with priority layers. Aspects of the identifying of the layer of interest are described in connection with the example flowchart 600 of FIG. 6.

At 408, the apparatus may determine coordinates for a region of interest based on characteristics associated with the identified layer of interest, as described in connection with the examples of FIGS. 1 to 3. For example, the region of interest determining component 144 may be configured to determine the coordinates for the region of interest based on the positional information associated with the layer of interest. In some examples, the region of interest determining component 144 may reuse the positional information as the coordinates for the region of interest (e.g., the first coordinates and the second coordinates of the position information of the layer of interest may be used as the first coordinates and the second coordinates defining the region of interest). In some examples, the region of interest determining component 144 may modify the positional information to determine the coordinates for the region of interest. For example, the region of interest determining component 144 may select a sub-region based on the positional information, may scale-up the positional information to increase the size of the region of interest relative to the size of the layer of interest, or may scale-down the positional information to decrease the size of the region of interest relative to the size of the layer of interest.

At 410, the apparatus may perform display processing techniques on the region of interest to improve visual aspects of the region, as described in connection with the examples of FIGS. 1 to 3. For example, the region of interest display processing component 148 may be configured to perform one or more display processing techniques (e.g., LTM, WNR, LNR, saturation adjustment, hue adjustment, temperature adjustment, assertive display adjustment, etc.) on the regions of the composited frame based on the coordinates associated with the region of interest. The region of interest display processing component 148 may then store the processed frame in the frame buffer 134 of the memory 130.

At 412, the apparatus may display the composited frame including the processed region of interest, as described in connection with the examples of FIGS. 1 to 3. For example, the display client 150 may be configured to access (e.g., retrieve or receive) the processed frame from the frame buffer 134 and facilitate presentment of the processed frame.

It may be appreciated that the composited frame output for display may include a first portion corresponding to a layer of interest and on which one or more display processing techniques were performed (e.g., at 410 above) and second portion(s) corresponding to rendered layers that were not identified as layers of interest and on which the one or more display processing techniques were not performed.

FIG. 5 illustrates an example flowchart 500 of an example method in accordance with one or more techniques of this disclosure. The method may be performed by an apparatus, such as the device 100 of FIG. 1, a CPU, an application processor, a DPU, a display processor, a GPU, a graphics processor, a video processor, and/or a component of the device 100, such as the display processor 140, the compositing component 142, the region of interest determining component 144, and/or the region of interest display processing component 148. The example method of FIG. 5 may facilitate improving visual aspects of a region of interest of a frame prior to the compositing of the layers of the frame.

At 502, the apparatus may render a plurality of layers based on respective graphics data generated for display, as described in connection with the examples of FIGS. 1 to 3. For example, one or more applications 112 may be configured to generate graphics data and the graphics processor 120 may be configured to render the set of layers 210 based on the respective graphics data.

At 504, the apparatus may identify a layer of interest of the plurality of layers as described in connection with the examples of FIGS. 1 to 3. For example, the region of interest determining component 144 may be configured to identify the layer of interest based on characteristics associated with the plurality of layers and a data structure populated with identifiers associated with priority layers. Aspects of the identifying of the layer of interest are described in connection with the example flowchart 600 of FIG. 6.

At 506, the apparatus may determine coordinates for a region of interest based on characteristics associated with the identified layer of interest, as described in connection with the examples of FIGS. 1 to 3. For example, the region of interest determining component 144 may be configured to determine the coordinates for the region of interest based on the positional information associated with the layer of interest. In some examples, the region of interest determining component 144 may reuse the positional information as the coordinates for the region of interest (e.g., the first coordinates and the second coordinates of the position information of the layer of interest may be used as the first coordinates and the second coordinates defining the region of interest). In some examples, the region of interest determining component 144 may modify the positional information to determine the coordinates for the region of interest. For example, the region of interest determining component 144 may select a sub-region based on the positional information, may scale-up the positional information to increase the size of the region of interest relative to the size of the layer of interest, or may scale-down the positional information to decrease the size of the region of interest relative to the size of the layer of interest.

At 508, the apparatus may perform display processing techniques on the region of interest to improve visual aspects of the region, as described in connection with the examples of FIGS. 1 to 3. For example, the region of interest display processing component 148 may be configured to perform one or more display processing techniques (e.g., LTM, WNR, LNR, saturation adjustment, hue adjustment, temperature adjustment, assertive display adjustment, etc.) on pixel data based on the coordinates associated with the region of interest. The region of interest display processing component 148 may then store the processed layer in the layer buffer 132 of the memory 130.

At 510, the apparatus may perform compositing of the plurality of layers, including the processed layer, to generate a composited frame, as described in connection with the examples of FIGS. 1 to 3. For example, the compositing component 142 may be configured to retrieve (or receive) the rendered layers, including the processed layer on which one or more display processing techniques were performed, from the layer buffer 132 and perform compositing on the rendered layers and the processed layer to generate a composited frame. For example, the compositing component 142 may blend pixel data of the rendered layers and the processed layers to generate the composited frame.

At 512, the apparatus may display the composited frame, as described in connection with the examples of FIGS. 1 to 3. For example, the display client 150 may be configured to access (e.g., retrieve or receive) the composited frame from the frame buffer 134 and facilitate presentment of the composited frame.

It may be appreciated that the composited frame output for display may include a first portion corresponding to a layer of interest and on which one or more display processing techniques were performed (e.g., at 508 above) and second portion(s) corresponding to rendered layers that were not identified as layers of interest and on which the one or more display processing techniques were not performed.

FIG. 6 illustrates an example flowchart 600 of an example method in accordance with one or more techniques of this disclosure. The method may be performed by an apparatus, such as the device 100 of FIG. 1, a CPU, an application processor, a DPU, a display processor, a GPU, a graphics processor, a video processor, and/or a component of the device 100, such as the display processor 140, the compositing component 142, the region of interest determining component 144, and/or the region of interest display processing component 148. In some examples, aspects of the flowchart 600 may be implemented at 406 of FIG. 4 and/or at 504 of FIG. 5 to facilitate identifying the layer of interest of the plurality of layers.

At 602, the apparatus may obtain layer identifiers for the respective layers of a frame, as described in connection with the examples of FIGS. 1 to 3. For example, the region of interest determining component 144 may be configured to retrieve (or receive) the identifiers associated with each of the layers for a frame stored at the layer buffer 132 of the memory 130.

At 604, the apparatus may query a data structure using the obtained layer identifiers, as described in connection with the examples of FIGS. 1 to 3. For example, the region of interest determining component 144 may be configured to query the layer of interest list 146 using the obtained layer identifiers to determine if one of the layer identifiers matches an identifier included in the layer of interest list 146. In some examples, the identifiers included in the layer of interest list 146 may correspond to priority layers or to relatively low priority layers. In some example, the layer of interest list 146 may be populated with a pre-generated list of identifiers. In some examples, the layer of interest list 146 may be populated with a modified list of identifiers. For example, the layer of interest list 146 may include a pre-generated list of identifiers and a list of modified identified based on the pre-generated list of identifiers.

At 606, the apparatus may determine whether a layer identifier of the respective layers of the frame matches an identifier included in the data structure, as described in connection with the examples of FIGS. 1 to 3. For example, the layer of interest list 146 may indicate to the region of interest determining component 144 when a layer identifier matches a pre-generated identifier or a modified identifier included in the layer of interest list 146.

If, at 606, the apparatus determines that a layer identifier matches an identifier included in the data structure, then, at 608, the apparatus may flag the layer corresponding to the matching layer identifier as a layer of interest, as described in connection with the examples of FIGS. 1 to 3. For example, the region of interest determining component 144 may determine that the layer corresponding to the matching layer identifier is a layer of interest.

If, at 606, the apparatus determines that no layer identifier matches an identified included in the data structure, then, at 610, the apparatus may determine that the frame does not include a layer of interest, as described in connection with the examples of FIGS. 1 to 3. For example, the region of interest determining component 144 may determine that the frame does not include a layer of interest. In some such examples, the performing of one or more display processing techniques on the frame (or a region of the frame) may be avoided.

It may be appreciated that in some examples, the data structure may include identifiers associated with layers that are relatively low priority. In some such examples, at 606, the apparatus may compare the layer identifiers associated with the frame to the relatively low priority identifiers stored at the data structure to identify any layers of the frame that are of relatively low priority. In some such examples, if, at 606, the apparatus determines that a layer identifier of the frame matches an identifier in the data structure, then, at 608, the apparatus may determine that the corresponding layer is a layer of relatively low priority. After all of the layers of the frame are processed, the apparatus may then flag any remaining layers (e.g., any layers that are not identified as relatively low priority layers) as layer(s) of interest.

Figure 7:
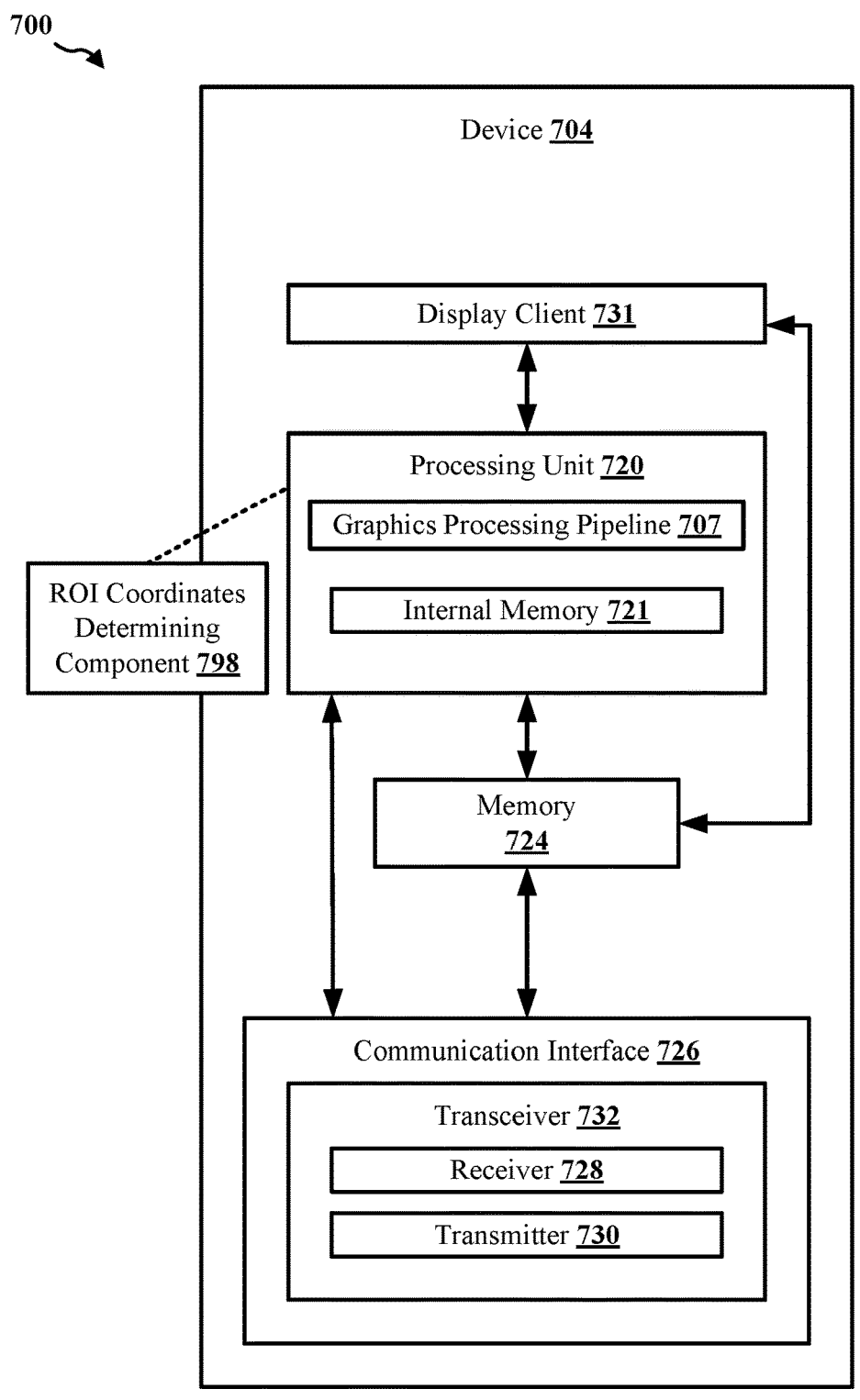
FIG. 7 is a block diagram that illustrates an example content generation system, in accordance with one or more techniques of this disclosure.

FIG. 7 is a block diagram that illustrates an example content generation system 700 configured to implement one or more techniques of this disclosure. The content generation system 700 includes a device 704. The device 704 may include one or more components or circuits for performing various functions described herein. One or more aspects of the device 704 may be implemented by the example device 100 of FIG. 1. In some examples, one or more components of the device 704 may be components of an SOC. The device 704 may include one or more components configured to perform one or more techniques of this disclosure. In the example shown, the device 704 may include a processing unit 720 and a system memory 724. In some examples, the device 704 can include a number of additional or alternative components, e.g., a communication interface 726, a transceiver 732, a receiver 728, a transmitter 730, and a display client 731.

The processing unit 720 may include an internal memory 721. The processing unit 720 may be configured to perform graphics processing, such as in a graphics processing pipeline 707. In some examples, the processing unit 720 may include a display processor to perform one or more display processing techniques on one or more frames generated by the processing unit 720 before presentment of the generated frame(s) by the display client 731. The display processor may be configured to perform display processing. For example, the display processor may be configured to perform one or more display processing techniques on one or more frames generated by the processing unit 720. The display processor may output image data to the display client 731 according to an interface protocol, such as, for example, the MIPI DSI (Mobile Industry Processor Interface, Display Serial Interface). One or more aspects of the processing unit 720 may be implemented by the application processor 110, the graphics processor 120, and/or the display processor 140 of FIG. 1. One or more aspects of the internal memory 721 may be implemented by the memory 130 of FIG. 1.

The display client 731 may be configured to display or otherwise present frames processed by the processing unit 720 (and/or the display processor). One or more aspects of the display client 731 may be implemented by the display client 150 of FIG. 1. In some examples, the display client 731 may include one or more of: a liquid crystal display (LCD), a plasma display, an organic light emitting diode (OLED) display, a projection display device, an augmented reality display device, a virtual reality display device, a head-mounted display, or any other type of display device.

Reference to the display client 731 may refer to one or more displays. For example, the display client 731 may include a single display or multiple displays. The display client 731 may include a first display and a second display. In further examples, the results of the graphics processing may not be displayed on the device, e.g., the first and second displays may not receive any frames for presentment thereon. Instead, the frames or graphics processing results may be transferred to another device. In some aspects, this can be referred to as split-rendering.

As disclosed above, the display client 731 may be configured in accordance with MIPI DSI standards. The MIPI DSI standard supports a video mode and a command mode. In examples in which the display client 731 is operating in the video mode, the processing unit 720 (and/or the display processor) may continuously refresh the graphical content of the display client 731. For example, the entire graphical content may be refreshed per refresh cycle (e.g., line-by-line).

In examples in which the display client 731 is operating in the command mode, the processing unit 720 (and/or the display processor) may write the graphical content of a frame to a buffer. In some examples, one or more aspects of the buffer may be implemented by the frame buffer 134 of FIG. 1. In some examples, the buffer may be included in the display client 731 and, thus, may represent memory local to the display client 731. In some such examples, the processing unit 720 (and/or the display processor) may not continuously refresh the graphical content of the display client 731. Instead, the processing unit 720 (and/or the display processor) may use a vertical synchronization (Vsync) pulse to coordinate rendering and consuming of graphical content at the buffer. For example, when a Vsync pulse is generated, the processing unit 720 (and/or the display processor) may output new graphical content to the buffer. Thus, the generating of the Vsync pulse may indicate when current graphical content at the buffer has been rendered.

Memory external to the processing unit 720, such as memory 724, may be accessible to the processing unit 720 and/or the display client 731. For example, the processing unit 720 may be configured to read from and/or write to external memory, such as the memory 724. The processing unit 720 and the display client 731 may be communicatively coupled to the memory 724 over a bus. In some examples, the processing unit 720, the memory 724, and the display client 731 may be communicatively coupled to each other over the bus or a different connection.

It should be appreciated that in some examples, the device 704 may include a content encoder/decoder configured to receive graphical and/or display content from any source, such as the memory 724 and/or the communication interface 726. The memory 724 may be configured to store received encoded content or decoded content. In some examples, the content encoder/decoder may be configured to receive encoded content or decoded content (e.g., from the memory 724 and/or the communication interface 726) in the form of encoded pixel data. In some examples, the content encoder/decoder may be configured to encode or decode any content.

The internal memory 721 and/or the memory 724 may include one or more volatile or non-volatile memories or storage devices. In some examples, the internal memory 721 and/or the memory 724 may include RAM, SRAM, DRAM, erasable programmable ROM (EPROM), electrically erasable programmable ROM (EEPROM), flash memory, a magnetic data media or an optical storage media, or any other type of memory. One or more aspects of the internal memory 721 and/or the memory 724 may be implemented by the memory 130 of FIG. 1.

The internal memory 721 and/or the memory 724 may be a non-transitory storage medium according to some examples. The term "non-transitory" may indicate that the storage medium is not embodied in a carrier wave or a propagated signal. However, the term "non-transitory" should not be interpreted to mean that the internal memory 721 and/or the memory 724 is non-movable or that its contents are static. As one example, the memory 724 may be removed from the device 704 and moved to another device. As another example, the memory 724 may not be removable from the device 704.

The processing unit 720 may be a central processing unit (CPU), an application processor, a graphics processing unit (GPU), a graphics processor, a general purpose GPU (GPGPU), a display processing unit (DPU), a display processor, or any other processing unit that may be configured to perform display or graphics processing. In some examples, the processing unit 720 may be integrated into a motherboard of the device 704. In some examples, the processing unit 720 may be present on a graphics card that is installed in a port in a motherboard of the device 704, or may be otherwise incorporated within a peripheral device configured to interoperate with the device 704. The processing unit 720 may include one or more processors, such as one or more microprocessors, CPUs, application processors, GPUs, graphics processors, DSPs, display processors, image signal processors (ISPs), application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 720 may store instructions for the software in a suitable, non-transitory computer-readable storage medium, e.g., internal memory 721, and may execute the instructions in hardware using one or more processors to perform the techniques of this disclosure. Any of the foregoing, including hardware, software, a combination of hardware and software, etc., may be considered to be one or more processors.

In some aspects, the content generation system 700 can include a communication interface 726. The communication interface 726 may include a receiver 728 and a transmitter 730. The receiver 728 may be configured to perform any receiving function described herein with respect to the device 704. Additionally, the receiver 728 may be configured to receive information (e.g., eye or head position information, rendering commands, or location information) from another device. The transmitter 730 may be configured to perform any transmitting function described herein with respect to the device 704. For example, the transmitter 730 may be configured to transmit information to another device, which may include a request for content. The receiver 728 and the transmitter 730 may be combined into a transceiver 732. In such examples, the transceiver 732 may be configured to perform any receiving function and/or transmitting function described herein with respect to the device 704.

In some examples, the graphical content from the processing unit 720 for display via the display client 731 may not be static and may be changing. Accordingly, the processing unit 720 (and/or the display processor) may periodically refresh the graphical content displayed via the display client 731. For example, the processing unit 720 (and/or the display processor) may periodically retrieve graphical content from the memory 724, where the graphical content may have been updated by the execution of an application (and/or the processing unit 720) that outputs the graphical content to the memory 724.

Referring again to FIG. 7, in some aspects, the processing unit 720 may be configured to operate one or more techniques disclosed herein. For example, the processing unit 720 may include a region of interest coordinates determining component 798 to render a plurality of layers associated with respective graphical data for a frame, identify a layer of interest of the plurality of layers, determine coordinates for a region of interest based on one or more parameters associated with the identified layer of interest, and perform one or more display processing techniques on the region of interest based on the determined coordinates. For example, the region of interest coordinates determining component 798 may be configured to identify a layer of interest of a plurality of layers associated with a frame. Additionally, the example region of interest coordinates determining component 798 may be configured to determine coordinates for a region of interest based on characteristics associated with the identified layer of interest. Further, the example region of interest coordinates determining component 798 may be configured to perform display processing on the region of interest of the frame based on the coordinates for the region of interest.

In some examples, the region of interest coordinates determining component 798 may be configured to identify layer of interest by comparing respective identifiers associated with each layer of the plurality of layers with a list of priority identifiers. In some examples, the region of interest coordinates determining component 798 may be configured to generate a modified list of priority identifiers based on the list of priority identifiers. Further, in some examples, the region of interest coordinates determining component 798 may be configured to compare the respective identifiers associated with each layer of the plurality of layers with the list of priority identifiers and the modified list of priority identifiers.

In some examples, the region of interest coordinates determining component 798 may be configured to reuse coordinates defining a boundary of the identified layer of interest as the coordinates for the region of interest. In some examples, the region of interest coordinates determining component 798 may be configured to modify the coordinates defining the boundary of the identified layer of interest as the coordinates for the region of interest.

In some examples, the region of interest coordinates determining component 798 may be configured to perform compositing of the plurality of layers associated with the frame. Additionally, the region of interest coordinates determining component 798 may be configured to perform the display processing of the region of interest of the frame after the performing of the compositing.

In some examples, the region of interest coordinates determining component 798 may be configured to receive a processed layer based on the performing of the display processing of the region of interest of the frame. Additionally, the region of interest coordinates determining component 798 may be configured to perform compositing of the plurality of layers associated with the frame and the processed layer.

In some examples, the region of interest coordinates determining component 798 may be configured to perform the display processing by performing at least one of saturation adjustment techniques, hue adjustment techniques, temperature adjustment techniques, and assertive display adjustment techniques.

In some examples, the region of interest coordinates determining component 798 may be configured to output the frame for presentment, wherein the output frame includes a first portion on which the display processing is performed and a second portion on which the display processing is not performed.

As described herein, a device, such as the device 704, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

In one configuration, a method or apparatus for display processing is provided. The apparatus may be a processing unit, a display processor, a display processing unit (DPU), a GPU, a graphics processor, an application processor, a CPU, a video processor, or some other processor that can perform display processing. In some examples, the apparatus may be the processing unit 720 within the device 704, or may be some other hardware within the device 704, or another device. For example, one or more aspects of the apparatus may be implemented by the device 100 of FIG. 1. The apparatus may include means for identifying a layer of interest of a plurality of layers associated with a frame. The apparatus may also include means for determining coordinates for a region of interest based on characteristics associated with the identified layer of interest. The apparatus may also include means for performing display processing on the region of interest of the frame based on the coordinates for the region of interest. The apparatus may also include means for identifying the layer of interest by comparing respective identifiers associated with each layer of the plurality of layers with a list of priority identifiers. The apparatus may also include means for generating a modified list of priority identifiers based on the list of priority identifiers. The apparatus may also include means for comparing the respective identifiers associated with each layer of the plurality of layers with the list of priority identifiers and the modified list of priority identifiers. The apparatus may also include means for determining the coordinates for the region of interest by reusing the coordinates as the coordinates for the region of interest. The apparatus may also include means for determining the coordinates for the region of interest by modifying the coordinates to determine the coordinates for the region of interest. The apparatus may also include means for performing compositing of the plurality of layers associated with the frame, and where the performing of the display processing of the region of interest of the frame is performed after the performing of the compositing. The apparatus may also include means for receiving a processed layer based on the performing of the display processing of the region of interest of the frame. The apparatus may also include means for performing compositing of the plurality of layers associated with the frame and the processed layer. The apparatus may also include means for performing the display processing by performing at least one of saturation adjustment techniques, hue adjustment techniques, temperature adjustment techniques, and assertive display adjustment techniques. The apparatus may also include means for outputting the frame for presentment, and where the output frame includes a first portion on which the display processing is performed and a second portion on which the display processing is not performed.

The subject matter described herein can be implemented to realize one or more benefits or advantages. For instance, the described display and/or graphics processing techniques can be used by a display processor, a display processing unit (DPU), a graphics processor, a GPU, or a video processor or some other processor that can perform region of interest tracking for in-motion frames and/or reduce the load of a processing unit (e.g., any processing unit configured to perform one or more techniques disclosed herein, such as a GPU, a DPU, and the like). In general, examples disclosed herein provide techniques for improving region of interest tracking for in-motion frames.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of graphics processing, comprising:
rendering a plurality of layers associated with a frame of a set of in-motion frames;
compositing the rendered plurality of layers associated with the frame to form a composited frame;
querying a data structure comprising a list of priority identifiers based on identifiers associated with each rendered layer of interest of the composited rendered plurality of layers to match a respective identifier associated with a rendered layer of interest of the composited rendered plurality of layers with an identifier of the list of priority identifiers;
identifying the rendered layer of interest of the rendered plurality of layers associated with the frame of the set of in-motion frames based on the matched respective identifier;
determining coordinates for a region of interest based on characteristics associated with the identified layer of interest after an identification of the identified layer of interest; and
performing display processing on the region of interest of the composited frame bounded by the determined coordinates for the region of interest after compositing the rendered plurality of layers.

2. The method of claim 1, wherein the list of priority identifiers comprises a pre-generated list of identifiers.

3. The method of claim 1, further comprising:
generating a modified list of priority identifiers based on the list of priority identifiers, wherein matching the respective identifier associated with the rendered layer of interest of the rendered plurality of layers with the identifier of the list of priority identifiers comprises:
comparing respective identifiers associated with each rendered layer of the rendered plurality of layers with each priority identifier of the list of priority identifiers and the modified list of priority identifiers.

4. The method of claim 3, further comprising:
identifying a second rendered layer of interest of the rendered plurality of layers associated with the frame of the set of in-motion frames based on a second match between a second respective identifier associated with the second rendered layer of interest and a modified identifier of the modified list of priority identifiers;
determining second coordinates for a second region of interest based on characteristics associated with the identified second rendered layer of interest after the identification of the identified second layer of interest; and
performing display processing on the second region of interest of the frame based on the determined second coordinates for the second region of interest.

5. The method of claim 1, wherein the characteristics associated with the identified layer of interest include coordinates defining a boundary of the identified layer of interest.

6. The method of claim 5, wherein determining the coordinates for the region of interest comprises:
reusing the coordinates as the coordinates for the region of interest.

7. The method of claim 5, wherein determining the coordinates for the region of interest comprises:
modifying the coordinates to determine the coordinates for the region of interest.

8. The method of claim 1, wherein performing the display processing comprises:
performing at least one of: saturation adjustment techniques, hue adjustment techniques, temperature adjustment techniques, or assertive display adjustment techniques on the region of interest of the frame.

9. The method of claim 1, wherein the frame includes a first portion bounded by the determined coordinates and a second portion not bounded by the determined coordinates, wherein performing display processing on the region of interest of the frame based on the determined coordinates for the region of interest after rendering the plurality of layers comprises:
performing the display processing on the first portion bounded by the determined coordinates; and
avoiding performing the display processing on the second portion not bounded by the region of interest, wherein the method further comprises displaying the frame after the performance of the display processing.

10. An apparatus for display processing, comprising:
memory; and
at least one processor coupled to the memory and configured to:
render a plurality of layers associated with a frame of a set of in-motion frames;
composite the rendered plurality of layers associated with the frame to form a composited frame;
query a data structure comprising a list of priority identifiers based on identifiers associated with each rendered layer of interest of the composited rendered plurality of layers to match a respective identifier associated with a rendered layer of interest of the composited rendered plurality of layers with an identifier of the list of priority identifiers;
identify the rendered layer of interest of the rendered plurality of layers associated with the frame of the set of in-motion frames based on the matched respective identifier;
determine coordinates for a region of interest based on characteristics associated with the identified layer of interest after an identification of the identified layer of interest; and
perform display processing on the region of interest of the composited frame bounded by the determined coordinates for the region of interest after compositing the rendered plurality of layers.

11. The apparatus of claim 10, wherein the list of priority identifiers comprises a pre-generated list of identifiers.

12. The apparatus of claim 10, wherein the at least one processor is further configured to:

generate a modified list of priority identifiers based on the list of priority identifiers, wherein, to match the respective identifier associated with the rendered layer of interest of the rendered plurality of layers with the identifier of the list of priority identifiers, the at least one processor is configured to:

compare the respective identifiers associated with each rendered layer of the rendered plurality of layers with each priority identifier of the list of priority identifiers and the modified list of priority identifiers.

13. The apparatus of claim 12, wherein the at least one processor is further configured to:

identify a second rendered layer of interest of the rendered plurality of layers associated with the frame of the set of in-motion frames based on a second match between a second respective identifier associated with the second rendered layer of interest and a modified identifier of the modified list of priority identifiers;

determine second coordinates for a second region of interest based on characteristics associated with the identified second rendered layer of interest after the identification of the identified second layer of interest; and perform display processing on the second region of interest of the frame based on the determined second coordinates for the second region of interest.

14. The apparatus of claim 10, wherein the characteristics associated with the identified layer of interest include coordinates defining a boundary of the identified layer of interest.

15. The apparatus of claim 14, wherein, to determine the coordinates for the region of interest, the at least one processor is configured to:

reuse the coordinates as the coordinates for the region of interest.

16. The apparatus of claim 14, wherein, to determine the coordinates for the region of interest, the at least one processor is configured to:

modify the coordinates to determine the coordinates for the region of interest.

17. The apparatus of claim 10, wherein, to perform the display processing, the at least one processor is configured to:

perform at least one of saturation adjustment techniques, hue adjustment techniques, temperature adjustment techniques, or assertive display adjustment techniques on the region of interest of the frame.

18. The apparatus of claim 10, wherein the frame includes a first portion bounded by the determined coordinates and a second portion not bounded by the determined coordinates, wherein, to perform display processing on the region of interest of the frame based on the determined coordinates for the region of interest after rendering the plurality of layers, the at least one processor is configured to:

perform the display processing on the first portion bounded by the determined coordinates; and avoid performing the display processing on the second portion not bounded by the region of interest, wherein the at least one processor is further configured to:

output the frame for presentment after the performance of the display processing.

19. The apparatus of claim 10, wherein the apparatus comprises a wireless communication device.

20. A non-transitory computer-readable medium storing computer executable code for display processing, the computer executable code, when executed by at least one processor, causes the at least one processor to:

render a plurality of layers associated with a frame of a set of in-motion frames;

composite the rendered plurality of layers associated with the frame to form a composited frame;

query a data structure comprising a list of priority identifiers based on identifiers associated with each rendered layer of interest of the composited rendered plurality of layers to match a respective identifier associated with a rendered layer of interest of the composited rendered plurality of layers with an identifier of the list of priority identifiers;

identify the rendered layer of interest of the rendered plurality of layers associated with the frame of the set of in-motion frames based on the matched respective identifier;

determine coordinates for a region of interest based on characteristics associated with the identified layer of interest after an identification of the identified layer of interest; and perform display processing on the region of interest of the composited frame bounded by the determined coordinates for the region of interest after compositing the rendered plurality of layers.

* * * * *